United States Patent [19]
Glasier et al.

[11] Patent Number: 5,668,450
[45] Date of Patent: Sep. 16, 1997

[54] HALF-WAVE, BRUSHLESS, FOUR-PHASE DC MOTOR WITH BIFILAR WINDINGS

[75] Inventors: David Allan Glasier, Cheshire; Joseph Frederick Rubin, Adams, both of Mass.

[73] Assignee: Martin Marietta Corp., Pittsfield, Mass.

[21] Appl. No.: 423,255

[22] Filed: Apr. 17, 1995

[51] Int. Cl.$^6$ .................................................. H02K 23/00
[52] U.S. Cl. ........................ 318/254; 318/138; 318/439
[58] Field of Search .................................. 318/254, 138, 318/439, 754; 336/145, 147, 182, 173; 310/184, 198

[56] References Cited

U.S. PATENT DOCUMENTS

| 5,293,308 | 3/1994 | Boys et al. ................... 336/145 |
| 5,321,342 | 6/1994 | Kruse ............................. 318/254 |
| 5,325,042 | 6/1994 | Murugan ....................... 318/254 |

OTHER PUBLICATIONS

"DC Motors Speed Controls Servo Systems; the Electro-Craft Engineering Handbook" by Reliance Motion Control Inc. (date not indicated), pp. 6–6 to 6–17.

Primary Examiner—Karen Masih
Attorney, Agent, or Firm—W. H. Meise; G. H. Krauss; S. A. Young

[57] ABSTRACT

A half-wave brushless, four-phase DC motor includes sets of four stator windings fed at 90° phase increments by four switches. The 0° and 180° windings are wound about their magnetic stator poles in bifilar conductor pairs, and the 90° and 270° windings are similarly wound. The bifilar windings are connected to generate the same directions of magnetic fields as the prior-art windings. As a result of the bifilar windings, the magnetic fields of the windings tend to be identical, and all the inductances of each winding tend to be transformer-coupled to the other winding of the bifilar pair. During sequential turn-off of the switches in normal operation, the coupled inductance causes a voltage kick which is poled so it can be damped, and the energy returned to the source, by a diode coupled across the other switch of the bifilar pair. Thus, a half-wave brushless DC motor keeps its advantage of low parts count and simplicity, while gaining the advantages of a full-wave motor in efficiency and voltage spike reduction.

6 Claims, 4 Drawing Sheets

HALF-WAVE, BRUSHLESS, FOUR-PHASE DC MOTOR WITH BIFILAR WINDINGS

FIELD OF THE INVENTION

This invention relates to half-wave, four-phase brushless DC motors, and more particularly to such motors using bifilar windings and reverse-conduction diodes for energy damping and recovery.

BACKGROUND OF THE INVENTION

Direct-current (DC) motors have numerous applications, especially for vehicles having a battery voltage source. Such a motor requires a pair of magnets, one associated with the rotor or moving element, and the other associated with the stator. The continuous force required to cause movement of the rotor arises from continually repositioning the magnetic fields of the motor. In the past, both the rotor and the stator magnets have been configured as electromagnets. However, such an arrangement has the distinct disadvantage that electrical power must be coupled to the rotating rotor, which in turn requires reliance on brushes. The brushes may be a source of inefficiency, and adversely affect the reliability of the motor. With the advent of improved permanent magnets, and especially improved solid-state power control circuits, practical brushless motors have become very common.

In a brushless DC motor, the rotor includes a permanent magnet, thereby obviating the need for brushes to couple electrical energy to the rotor. The rotor permanent magnet interacts with a changing or rotating magnetic field produced by fixed stator windings, which are in turn energized by alternating or pulsating electric power produced by electronic switching circuits. The fixed stator windings provide the conditions for effective heat sinking of the windings to the motor structure. The electronic switching circuits associated with the motor are equivalent to a DC-to-AC converter.

One type of prior-art brushless DC motor includes two stator windings arranged as illustrated in FIG. 1 to produce mutually orthogonal magnetic fields when energized. One end of each of the stator windings 86, 88 is grounded. In such a brushless DC motor, the non-grounded end of each stator winding is alternately coupled to positive and negative direct-voltage sources +V, −V, by a pair of alternately switched power transistors arranged in a "totem-pole" connection. In FIG. 1, bipolar PNP transistor 70 has its emitter coupled to +V, and its collector connected to the collector of bipolar NPN transistor 72, and to the ungrounded end of stator winding 86. The emitter of transistor 72 is connected to −V. Similarly, the emitters of PNP transistor 74 and NPN transistor 76 are connected to +V and −V, respectively, and their collectors are connected together and to the ungrounded end of stator winding 88. Damping diodes 78, 80, 82, and 84 are coupled from the collectors to the emitters of transistors 70, 72, 74, and 76, respectively. In the context of brushless DC motors, such an arrangement with two transistors driving one end of a winding alternately positive and negative is termed "full-wave." By contrast, in a "half-wave" arrangement, one end of a stator winding is coupled to one terminal of a direct voltage source, and the other end of the winding is coupled by a single switch to the other terminal of the DC source. Thus, the full-wave control arrangement requires two switching transistors for each stator winding, while the half-wave control arrangement uses only one switching transistor for each stator winding. Reduced transistor count is desirable both reduced cost and for enhanced reliability. The full-wave arrangement, on the other hand, since it divides the supply voltage across two power switching transistors, tends to be used when the full supply voltage would tend to exceed the breakdown voltages of the transistors.

The stator windings by their very nature are inductive, since they are configured to form a substantial magnetic field, which stores energy. Among the considerations which must be taken into account in establishing a control switch topology for a brushless DC motor is that of limiting the voltage surge tending to appear across the switching transistors when the current in an inductive stator winding is being switched to a nonconductive or OFF state. In a totem-pole full-wave drive arrangement such as that of FIG. 1, a diode is coupled across each of the switching transistors, poled to carry the current which occurs due to the inductive voltage rise or "kick" when the other of the switching transistors switches OFF, and to return the energy contained in the "kick" to the power supply. The return of the stored energy from the winding to the supply is very desirable in order to reduce power consumption and thereby increase energy efficiency of the motor. However, the half-wave switching arrangement is not amenable to such a solution, since there is but one switching transistor; the best that can be done is to couple a diode across the inductive stator winding to recirculate the inductive current through the stator winding itself, thereby dissipating the energy in the winding and the diode. For this reason, the full-wave arrangement tends to be more efficient than the half-wave arrangement. It would be desirable to combine the cost and reliability advantage of half-wave switching of the stator current with the efficiency advantage of recirculating the inductive energy at switch-off to the power source.

SUMMARY OF THE INVENTION

A brushless DC motor is adapted to be connected to first and second terminals of a voltage source. The motor has a rotor which maintains a permanent magnetic field. An elongated bifilar wire defines a first end and a second end. The bifilar wire includes first and second electrical conductors, so each of the first and second conductors has mutually adjacent first and second ends. The bifilar wire is wound as a stator winding. A stator winding source connection arrangement is provided for connecting the first end of the first conductor and the second end of the second conductor to the first terminal of the voltage source, whereupon current flows, at different times during a cycle of normal operation, in opposite directions through the first and second conductors. A first controllable switching arrangement is coupled to the second end of the first conductor and to the second terminal of the voltage source, for switching between conductive and nonconductive states in response to a first switching control signal. A first unidirectional current conductive arrangement is associated with the first controllable switching arrangement, for conducting in response to a reverse voltage which may appear across the first controllable switching arrangement during intervals in which the first controllable switching arrangement is in the nonconductive state. A second controllable switching arrangement is coupled to the first end of the second conductor and to the second terminal of the voltage source, for switching between conductive and nonconductive states in response to a second switching control signal. A second unidirectional current conductive arrangement is associated with the second controllable switching arrangement, for conducting in response to a reverse voltage which may appear across the second controllable switching arrangement during intervals in which the second controllable switching arrangement is in the nonconductive state. The motor responds to a control arrangement coupled to the first and second controllable switching arrangements, for generating the first and second control signals in a mutually alternating manner, as a result of which the first and second switching arrangements alternate conduction, and an inductive voltage pulse, generated by the entering of one of said first and second switching arrangements into the nonconductive state, is transformer-coupled through the bifilar wire, and is damped by conduction of the unidirectional current conducting device associated with the other one of the controllable switching arrangements.

In a particular embodiment of the invention, the first and second controllable switching arrangements each includes a transistor, and the first and second unidirectional current conducting arrangement each includes a semiconductor diode. The transistors are preferably FETs which inherently include the diodes.

The motor, in one embodiment of the invention, is a half-wave, four-phase motor, which includes a second bifilar wire with two conductors, wound to form two additional stator windings, and which also includes a further pair of controllable switches and reverse-conduction diodes.

DESCRIPTION OF THE DRAWING

FIG. 2b is a simplified schematic diagram of the arrangement of FIG. 2a;

FIG. 3b is a simplified schematic diagram of the arrangement of FIG. 3a.

DESCRIPTION OF THE INVENTION

Figure 2B:
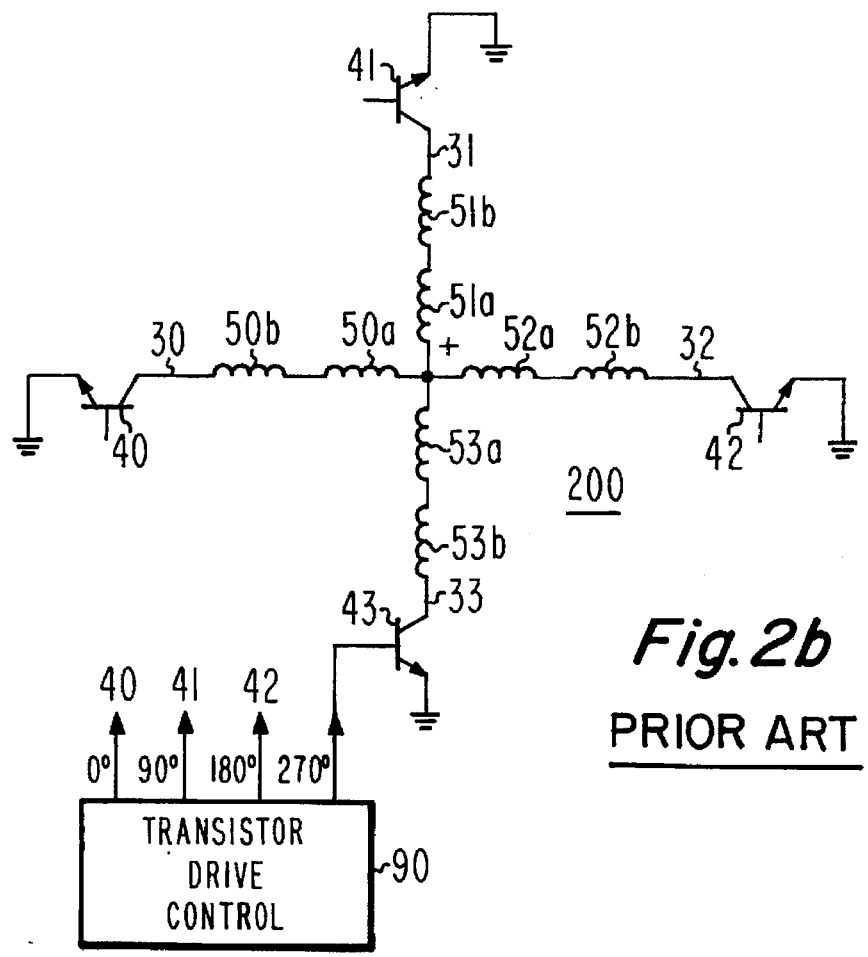
Figure 2A:
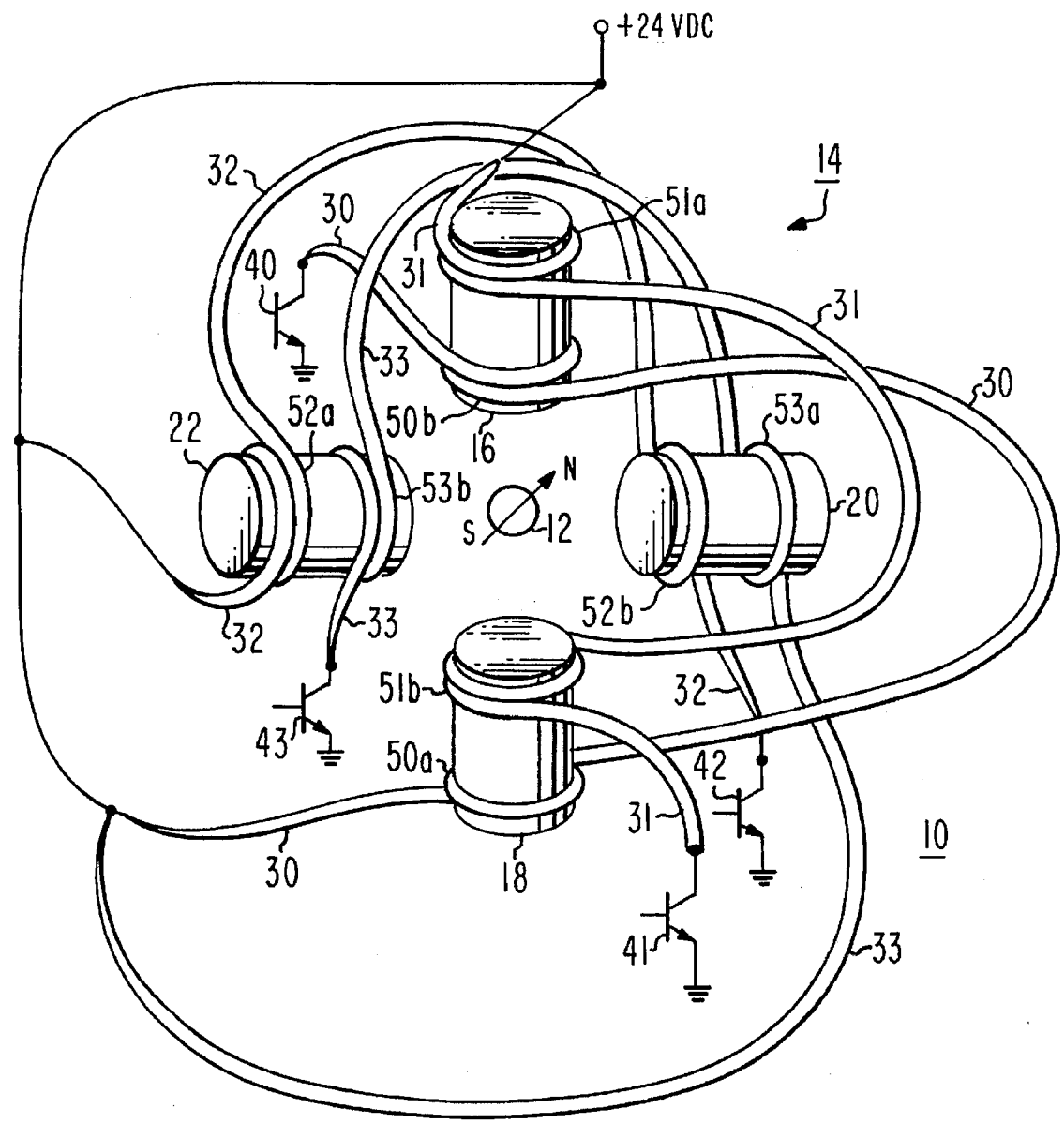
FIG. 2a is a simplified perspective or isometric view of a portion of one type of prior-art brushless DC motor, which includes four stator windings arranged to produce mutually orthogonal magnetic fields, and also illustrating half-wave connections.

In FIGS. 2a and 2b, a prior-art half-wave brushless direct-voltage or direct-current (DC) motor 10 includes a permanently magnetized rotor illustrated as 12, and a stator designated generally as 14. Stator 14 includes four magnetic pieces or poles 16, 18, 20, and 22, which are spaced about the rotor 12. Those skilled in the art know that the number of such poles may be much greater than four, but that the principles of operation are understood from four poles. The magnetic poles 16–22 (where the hyphen represents the word "through") themselves are not permanently magnetized to any significant extent, and derive their magnetic properties from current flow through the associated magnetic windings.

In FIGS. 2a and 2b, a terminal of a +24 volt DC source is connected by an insulated wire conductor (insulation not shown separately) 30, which is wound about pole 18 to form a winding 50a, and which continues to, and is wound about, pole 16, to form a second winding 50b. From winding 50b, wire 30 continues to the collector of an NPN switching transistor 40, the emitter of which is connected to a ground terminal. Similarly, the +24 volt DC source is connected by an insulated wire conductor 31, which is wound about pole 16 to form a winding 51a, and which continues to, and is wound about pole 18, to form a second winding 51b. From winding 51b, wire 31 continues to the collector of an NPN switching transistor 41, the emitter of which is connected to ground. The +24 volt DC source is connected by an insulated wire conductor 32, which is wound about pole 22 to form a winding 52a, and which continues to, and is wound about, pole 20, to form a second winding 52b. From winding 52b, wire 32 continues to the collector of an NPN switching transistor 42, the emitter of which is connected to ground. Finally, the +24 volt DC source is connected by a conductor 33, which is wound about pole 20 to form a winding 53a, and which continues to, and is wound about, pole 22, to form a second winding 53b. From winding 53b, wire 33 continues to the collector of an NPN switching transistor 43, the emitter of which is connected to ground.

In the arrangement of FIGS. 2a and 2b, conduction of transistor 40 results in current flow through windings 50a and 50b which makes the end of pole 16 adjacent the rotor 12 magnetically positive, and makes the end of pole 18 which is adjacent to rotor 12 magnetically negative. Conduction of transistor 41 results in current flow through windings 51a and 51b which makes the end of pole 16 adjacent the rotor 12 magnetically negative, and makes the end of pole 18 adjacent rotor 12 magnetically positive. Conduction of transistor 42 results in current flow through windings 52a and 52b which makes the end of pole 20 adjacent the rotor 12 magnetically positive, and makes the end of pole 22 adjacent the other side of rotor 12 magnetically negative. Conduction of transistor 43 results in current flow through windings 53a and 53b which makes the end of pole 20 adjacent the rotor 12 magnetically negative, and makes the end of pole 22 adjacent the other side of rotor 12 magnetically positive. As known to those skilled in the art, energization of transistors 40–43 in controlled sequence causes the various polarities of the windings to interact with the polarities of the rotor to induce or maintain rotation. FIG. 2b illustrates as a block 90 the transistor drive controller, for driving the bases of transistors 40, 41, 42, and 43 with a continuous sequence of base drive signals which are at relative 0°, 90°, 180°, and 270° phases, for generating the desired magnetic torque sequence for causing and maintaining rotation of the rotor. As known, such a controller may receive inputs from sensors associated with the motor for measuring various motor parameters such as speed, position and the like, to aid in establishing the proper phase sequence of drive signals.

Figure 1:
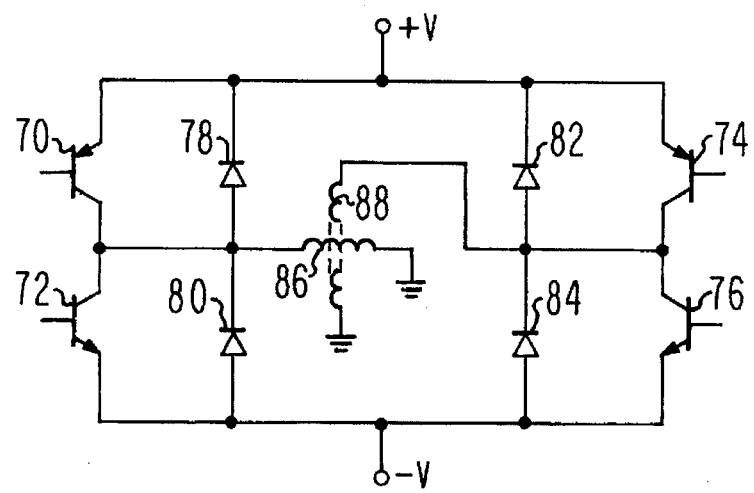
FIG. 1 is a simplified schematic diagram of a prior-art full-wave brushless DC motor drive circuit.

As mentioned above, the windings of the arrangement of FIGS. 2a and 2b are inductive by their very nature, since only an inductive component can cause, a magnetic field. This magnetic field represents stored energy. When a switching transistor, which is supplying electrical current to an inductive winding, is switched to a nonconductive state, as is required during the operation of a full-wave or a half-wave brushless DC motor, the magnetic field associated with the winding tends to expend its stored energy in the form of a voltage rise or "kick" poled in a manner which tends to maintain the current flow. In the full-wave arrangement of FIG. 1, diodes 78–84 are poled to allow the flow of current in response to the inductive kick, which results in a tendency to protect the transistors against breakdown due to excessive reverse voltage, and also returns the energy from the inductive winding to the source of voltage, thereby increasing the efficiency.

However, in the half-wave arrangement of FIGS. 2a and 2b, such a solution is not possible. When one of the transistors of FIGS. 2a and 2b is rendered nonconductive after a period of conduction, the inductive voltage kick produced by the associated windings is poled in a manner which cannot be returned to the source by a diode. For example, if transistor 43 is initially in a conductive state, which allows current flow through windings 53a and 53b, current tends to increase in the inductive winding until the associated transistor is rendered nonconductive. As the transistor conduction is decreased toward nonconduction, a voltage rise at the collector due to the inductance of the winding is added to the +24 volts of the source, to create a positive-going voltage spike at the collector of transistor 43. A diode (not illustrated) having its anode connected to the collector of transistor 43 and its cathode grounded would return the energy represented by the spike to the power supply, but would also remain permanently conductive, thereby bypassing transistor 43 and preventing any control by transistor 43. If such a diode were to be connected with its cathode coupled to the collector of transistor 43, and its anode grounded, it would never become conductive, and would provide no protection to the transistor, nor would it return energy to the source. A diode with its anode connected to the collector of transistor 43, and its cathode connected to the +24 volt source, would become conductive during the spike to protect the transistor from overvoltage by limiting the collector voltage to one diode drop above the +24 volt source, but would not return energy to the source, and merely dissipates the energy over time in the losses of the windings and the diode.

Figure 3A:
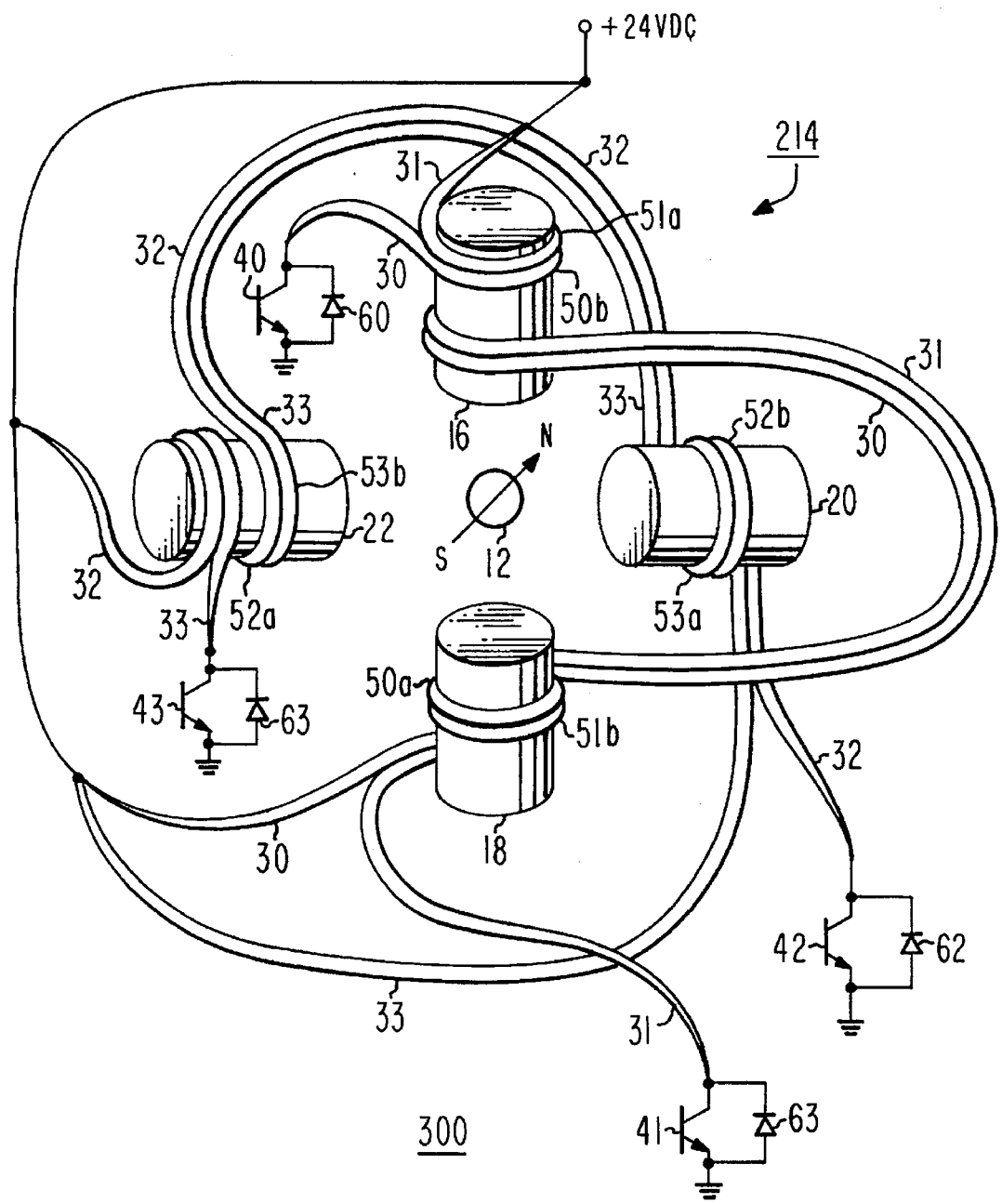
FIG. 3a is a simplified perspective or isometric view of a brushless DC motor according to the invention, in which the stator windings are bifilar-wound to provide transformer action which couples an inductive kick at turn-off to the other winding and back to the power source.
Figure 3B:
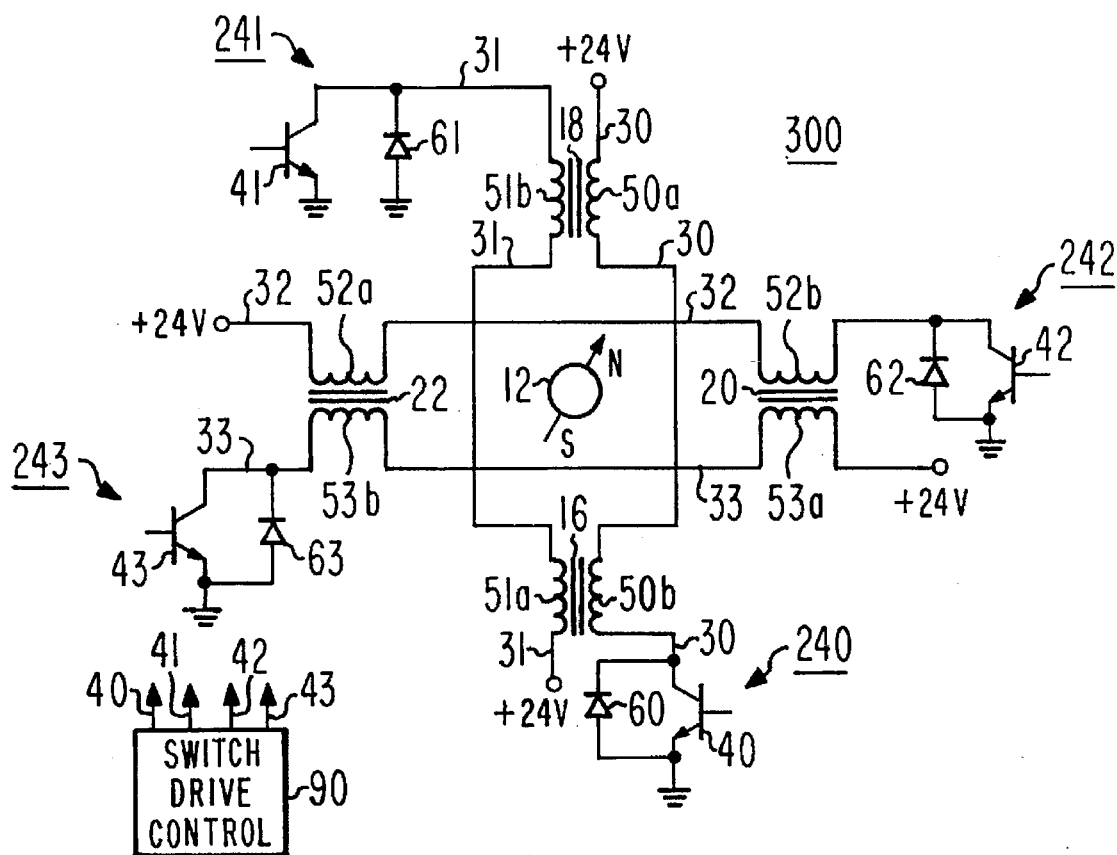

FIGS. 3a and 3b illustrate a motor according to the invention, in which the windings are formed with bifilar conductors or wire. In FIGS. 3a and 3b, elements corresponding to those of FIGS. 2a and 2b are designated by the same reference numerals. In FIGS. 3a and 3b, the windings about the poles 16, 18, 20, and 22 are made with bifilar conductors. More particularly, pole 16 has a single bifilar winding, in which conductors 30 and 31 are paired, and pole 18 has a single bifilar winding, in which the same conductors 30 and 31 are paired. As illustrated, conductor 30 is connected to ground by way of switching transistor 40 electrically adjacent to pole 16, and conductor 30 is connected to the +24 volt source electrically adjacent pole 18. Similarly, conductor 31 is connected to the +24 volt source adjacent pole 16, and is connected to ground by way of a switching transistor 41 adjacent pole 18. Pole 20 has a single bifilar winding, in which conductors 32 and 32 are paired, and pole 22 has a single bifilar winding, in which the same conductors 32 and 33 are paired. As illustrated, conductor 32 is connected to ground by way of switching transistor 42 electrically adjacent to pole 20, and conductor 33 is connected to the +24 volt source electrically adjacent pole 20. Similarly, conductor 33 is connected to the +24 volt source adjacent pole 20, and is connected to ground by way of switching transistor 43 adjacent pole 22.

Those skilled in the art will recognize that the only difference between the arrangement of FIGS. 2a and 2b and that of FIGS. 3a and 3b, as so far described, is that the windings on each pole are bifilar-wound instead of individually wound. The winding directions are such that the magnetic field directions when a transistor is conductive are the same as in the case of FIG. 2a. The physically close turns of winding in the arrangement of FIG. 3A result in tight magnetic coupling between the windings on each pole, with little or no uncoupled fields. That is to say, that the magnetic fields generated by the two windings on any one pole are essentially identical. Thus, the magnetic field generated by one winding can return essentially all of its energy to the other winding of the bifilar pair, without any losses due to uncoupled fields. This, in turn, allows the use of diodes, connected as illustrated in FIGS. 3a and 3b, to both protect their associated transistors from high voltages, and to return the energy from the inductive kick to the supply. Thus, a half-wave brushless DC motor maintains its advantage of simplicity over its full-wave counterpart, but also has the efficiency advantage realized from the return of energy to the supply.

In FIGS. 3a and 3b, each NPN bipolar switching transistor has a diode coupled thereacross, with the cathode of the diode coupled to the collector of the transistor, and with the anode of the diode connected to the emitter of the transistor or to ground. More particularly, bipolar NPN transistor 40 has a diode 60 coupled thereacross, with its cathode connected to the collector of transistor 40, and its anode connected to ground. Similarly, bipolar transistor 41 has a diode 61 connected thereto, with the cathode of the diode connected to the collector of transistor 41, and the anode of diode 61 connected to ground. Bipolar transistors 42 and 43 have diodes 62 and 63, respectively, connected thereto, with the cathodes of the diodes connected to the collectors of their respective transistors, and with the anodes of diodes 62 and 63 connected to ground.

The strong magnetic coupling between the conductors wound on each magnetic pole results in pulse transformer action during the turn-off of one of the associated switching transistors. When, for example, transistor 40 of FIGS. 3a and 3b is conducting, and current flows from the +24 volt supply through windings 50a and 50b, energy is stored in the magnetic field generated by the windings. As transistor 40 is turned OFF by reducing its base drive, the magnetic field begins to collapse about windings 50a and 50b, and the collapsing field cuts not only the turns of the conductor 30 of those windings, but also the turns of conductor 31, which is bifilar-wound therewith. Since the collapsing fields cut the turns of both conductors 30 and 31, voltage is induced in each of the windings, and the energy may be extracted from either winding. In the described arrangement, the turn-OFF of transistor 40 causes a voltage kick which is poled negative at the end of winding 51b adjacent to transistor 41, and positive at the end of winding 51a which is adjacent to the +24 volt supply. Since the voltage kick is much greater than the supply voltage, the cathode of diode 61 becomes negative with respect to ground, and diode 61 becomes conductive. Conventional current (as opposed to electron current) flows in a loop from ground through diode 61, through conductor 31 and the turns of windings 51b and 51a, into the positive supply, and back to ground. This direction of current flow is such as to return power to the supply. The power which is returned to the supply is that which was stored in the magnetic field of windings 50a and 50b during the conductive interval of transistor 40. Since energy was extracted from the magnetic fields around windings 50a and 50b, the magnitude of the inductive kick voltage is minimized, and the total voltage to which transistor 40 is subjected should not, in principle, exceed twice the source voltage, plus one diode forward voltage drop, which in the example is twice 24 volts, plus 0.7 volts for an ordinary silicon diode, totalling 48.7 volts. Nevertheless, there may be some residual fields which are coupled to one of the conductors of the bifilar windings and not to the other conductor. Such a field represents an uncoupled inductance, the energy of which cannot be extracted in the described manner, and which may produce a residual voltage kick at the collector of its associated transistor. By symmetry, all the transistors are protected in a similar manner, and energy is returned to the source from all of the windings.

Figure 4:
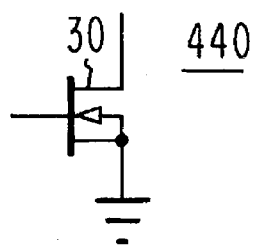
FIG. 4 represents an alternative switch.

According to a further aspect of the invention, the bipolar-transistor-plus-diode arrangements are replaced by field-effect transistors with inherent diodes, which are preferably MOSFETs. In FIG. 4, an N-channel field-effect power transistor 440 is illustrated, with its source connected to ground, and its drain connected to conductor 30. Such a MOSFET has an inherent diode connected between its source and its drain, which is equivalent to diode 60 associated with transistor 40 of FIG. 3b. Transistor 440 of FIG. 4 can therefore be directly substituted for bipolar transistor 40 and diode 60 of FIG. 3b, so long, of course, as the current, power-handling capabilities, voltage breakdown and so forth are equivalent. A major advantage of such FETs over bipolar transistors is that the control gate of the FET draws little or no current, by comparison with the base of the transistor.

Other embodiments of the invention will be apparent to those skilled in the art. While bipolar NPN transistors have been described, PNP transistors could be used by simply reversing the power-supply polarity; this would require connecting the anode of the energy recovery diodes to the collector of the PNP transistors, and their cathodes at ground. While the base or gate drive is somewhat more complex, the switching transistors could be connected adjacent the "hot" or ungrounded end of the supply voltage instead of adjacent to ground as illustrated.

What is claimed is:

1. A brushless DC motor adapted to be energized from a direct voltage source including first and second terminals, said motor comprising:

a rotor including a permanent magnet for producing a permanent magnetic field having at least one positive and one negative pole;

a first stator winding including a first terminal electrically connected to said first terminal of said voltage source, and also including a second terminal adapted to be electrically coupled to said second terminal of said voltage source during first intervals, said first stator winding being physically located at a reference angular position about said rotor, such that, when current flows from said voltage source through said first stator winding during said first intervals, a magnetic field is generated at said reference angular position, which magnetic field is capable of interacting with said permanent magnetic field;

a second stator winding including a first terminal electrically connected to said first terminal of said voltage source, and also including a second terminal adapted to be electrically coupled to said second terminal of said voltage source during second intervals different from said first intervals, said second stator winding being bifilar wound with said first stator winding, such that, when current flows from said voltage source through said second stator winding during said second intervals, a magnetic field capable of interacting with said permanent magnetic field is generated by said second stator winding;

first controllable switching means coupled to said second terminal of said voltage source and to said second terminal of said first stator winding, for switching between a conductive state and a nonconductive state in response to first and second portions of a first control signal;

second controllable switching means coupled to said second terminal of said voltage source and to said second terminal of said second stator winding, for switching between a conductive state and a nonconductive state in response to first and second portions of a second control signal; and control means coupled to said first and second switching means, for applying said first portion of said first control signal to said first switching means at times which alternate with the times at which said first portion of said second control signal are applied to said second switching means.

2. A motor according to claim 1, wherein said bifilar winding magnetically couples said first and second stator windings together to form a transformer, and further comprising:

first unidirectional current conducting means coupled in parallel with said first controllable switching means, poled for conducting in response to the entering of said nonconductive state by said second controllable switching means, whereby energy from said magnetic field of said second stator winding is returned to said voltage source by way of said first unidirectional current conducting means; and second unidirectional current conducting means coupled in parallel with said second controllable switching means, poled for conducting in response to the entering of said nonconductive state by said first controllable switching means, whereby energy from said magnetic field of said first stator winding is returned to said voltage source by way of said second unidirectional current conducting means.

3. A motor according to claim 2, further comprising:

a third stator winding including a first terminal electrically connected to said first terminal of said voltage source, and also including a second terminal adapted to be electrically coupled to said second terminal of said voltage source during third intervals different from said first and second intervals, said third stator winding being physically located at a second angular position about said rotor displaced by 90° from said reference angular position, such that, when current flows from said voltage source through said third stator winding during said third intervals, a magnetic field is generated at said second angular position, which magnetic field is capable of interacting with said permanent magnetic field;

a fourth stator winding including a first terminal electrically connected to said first terminal of said voltage source, and also including a second terminal adapted to be electrically coupled to said second terminal of said voltage source during fourth intervals different from said first, second, and third intervals, said fourth stator winding being bifilar wound with said third stator winding, wherein said bifilar winding magnetically couples said third and fourth stator windings together to form a transformer, such that, when current flows from said voltage source through said fourth stator winding during said fourth intervals, a magnetic field capable of interacting with said permanent magnetic field is generated by said fourth stator winding;

third controllable switching means coupled to said second terminal of said voltage source and to said second terminal of said third stator winding, for switching between a conductive state and a nonconductive state in response to first and second portions of a third control signal;

fourth controllable switching means coupled to said second terminal of said voltage source and to said second terminal of said fourth stator winding, for switching between a conductive state and a nonconductive state in response to first and second portions of a fourth control signal;

further control means coupled to said third and fourth controllable switching means, for applying said first portion of said third control signal to said third controllable switching means at times which alternate with the times at which said first portion of said fourth control signal are applied to said fourth controllable switching means;

third unidirectional current conducting means coupled in parallel with said third controllable switching means, poled for conducting in response to the entering of said nonconductive state by said fourth controllable switching means, whereby energy from said magnetic field of said fourth stator winding is returned to said voltage source by way of said third unidirectional current conducting means; and fourth unidirectional current conducting means coupled in parallel with said fourth controllable switching means, poled for conducting in response to the entering of said nonconductive state by said third controllable switching means, whereby energy from said magnetic field of said third stator winding is returned to said voltage source by way of said fourth unidirectional current conducting means.

4. A brushless DC motor adapted to be connected to first and second terminals of a voltage source, said motor comprising:

a rotor which maintains a permanent magnetic field;

an elongated bifilar wire defining a first end and a second end, said bifilar wire including first and second conductors, said wire being wound as a stator winding about said rotor;

stator winding source connection means, for connecting said first end of said first conductor and said second end of said second conductor to said first terminal of said voltage source;

first controllable switching means coupled to said second end of said first conductor and to said second terminal of said voltage source, for switching between conductive and nonconductive states in response to a first switching control signal;

first unidirectional current conductive means associated with said first controllable switching means, for conducting in response to a voltage applied across said first controllable switching means during intervals in which said first controllable switching means is in said nonconductive state;

second controllable switching means coupled to said first end of said second conductor and to said second terminal of said voltage source, for switching between conductive and nonconductive states in response to a second switching control signal;

second unidirectional current conductive means associated with said second controllable switching means, for conducting in response to a voltage applied across said second controllable switching means during intervals in which said second controllable switching means is in said nonconductive state; and control means coupled to said first and second controllable switching means, for generating said first and second control signals in a mutually alternating manner.

5. A motor according to claim 4, wherein said first and second controllable switching means each includes a transistor, and said first and second unidirectional current conducting means each includes a semiconductor diode.

6. A motor according to claim 4, wherein said first and second controllable switching means each includes a field-effect transistor, and said first and second unidirectional current conducting means include diodes inherent in the structure of said field-effect transistors.

* * * * *